United States Patent
Go et al.

(10) Patent No.: US 12,143,977 B2
(45) Date of Patent: Nov. 12, 2024

(54) METHOD FOR TRANSMITTING AND RECEIVING UPLINK SIGNAL IN WIRELESS COMMUNICATION SYSTEM, AND APPARATUS THEREFOR

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 441 days.

(21) Appl. No.: 17/594,106

(22) PCT Filed: Apr. 6, 2020

(86) PCT No.: PCT/KR2020/004622
§ 371 (c)(1),
(2) Date: Oct. 1, 2021

(87) PCT Pub. No.: WO2020/204675
PCT Pub. Date: Oct. 8, 2020

(65) Prior Publication Data
US 2022/0167335 A1   May 26, 2022

Related U.S. Application Data

(60) Provisional application No. 62/830,309, filed on Apr. 5, 2019.

(51) Int. Cl.
*H04W 72/044* (2023.01)

(52) U.S. Cl.
CPC ................. *H04W 72/046* (2013.01)

(58) Field of Classification Search
CPC ............ H04W 72/046; H04W 52/146; H04W 52/367; H04W 16/28; H04W 52/42;
(Continued)

(56) References Cited

U.S. PATENT DOCUMENTS

2009/0102927 A1* 4/2009 Tatsuta .................. H04L 5/1446
348/192
2018/0167897 A1  6/2018 Sampath et al.
(Continued)

OTHER PUBLICATIONS

PCT International Application No. PCT/KR2020/004622, International Search Report dated Jul. 20, 2020, 5 pages.
(Continued)

*Primary Examiner* — Kiet Tang
(74) *Attorney, Agent, or Firm* — LEE, HONG, DEGERMAN, KANG & WAIMEY

(57) ABSTRACT

A method of transmitting an uplink signal by a user equipment in a wireless communication system includes receiving configuration information related to transmission of an uplink signal and transmitting the uplink signal based on the configuration information. The configuration information includes information indicating a specific beam related to a maximum permissible exposure (MPE) of a radio frequency (RF), and the transmission of the uplink signal is based on the specific beam.

14 Claims, 17 Drawing Sheets

(58) Field of Classification Search
CPC . H04W 74/0833; H04B 7/088; H04B 7/0695; H04B 7/0404; H04B 7/0697; H04L 5/1446
See application file for complete search history.

(56) References Cited

U.S. PATENT DOCUMENTS

2019/0215220 A1* 7/2019 Islam ................ H04W 74/0833
2019/0305830 A1* 10/2019 Zhou .................... H04B 7/0697
2020/0112926 A1* 4/2020 Laghate .............. H04B 7/0404

OTHER PUBLICATIONS

Qualcomm Incorporated, "Enhancements on Multi-beam Operation," R1-1905027, 3GPP TSG-RAN WG1 Meeting #96-Bis, Apr. 2019, 26 pages.
Apple, "Consideration on multi-panel and MPE in FR2," R1-1904983, 3GPP TSG RAN WG1 #96-Bis, Apr. 2019, 7 pages.
Mediatek Inc., "Enhancements on multi-beam operations," R1-1904476, 3GPP TSG RAN WG1 #96-Bis, Apr. 2019, 11 pages.
Nokia et al., "Maximum uplink duty cycle for FR2 UE and its implications," R4-1903083, 3GPP TSG-RAN WG4 Meeting #90bis, Apr. 2019, 3 pages.

* cited by examiner

[FIG. 1]
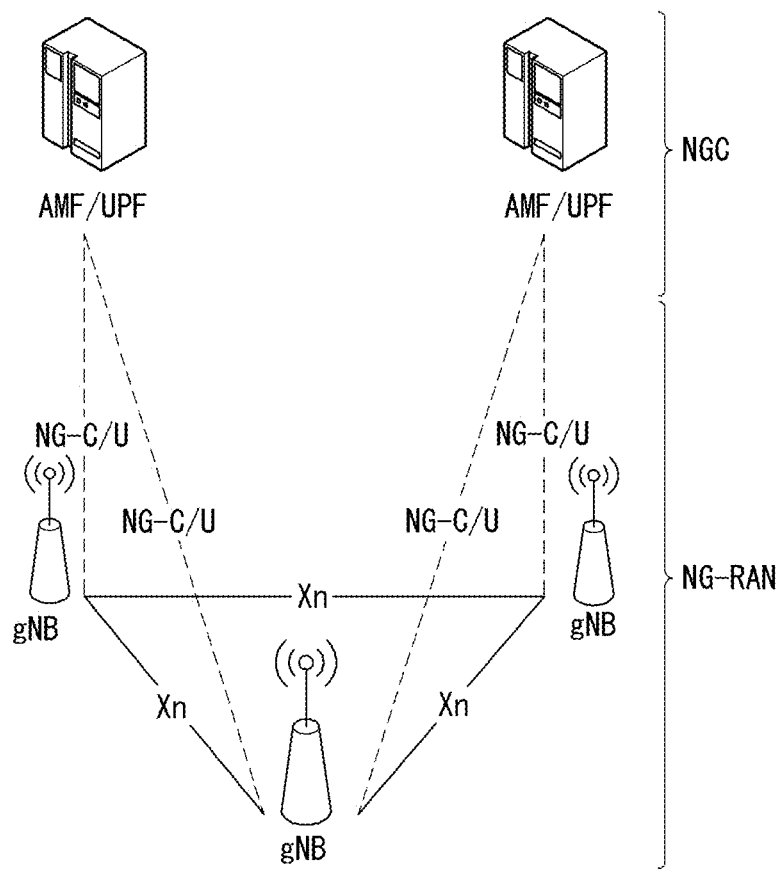

[FIG. 2]
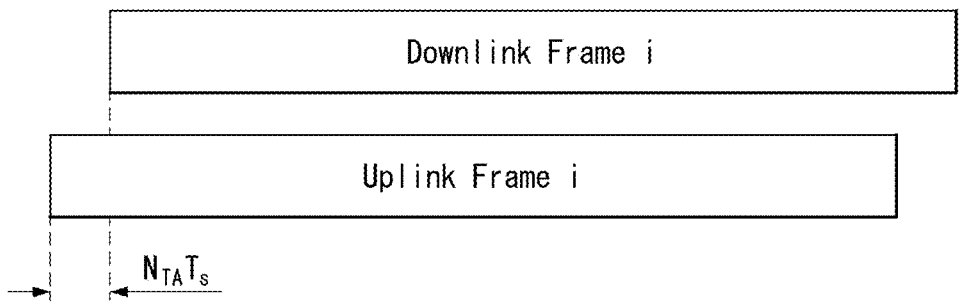

[FIG. 3]
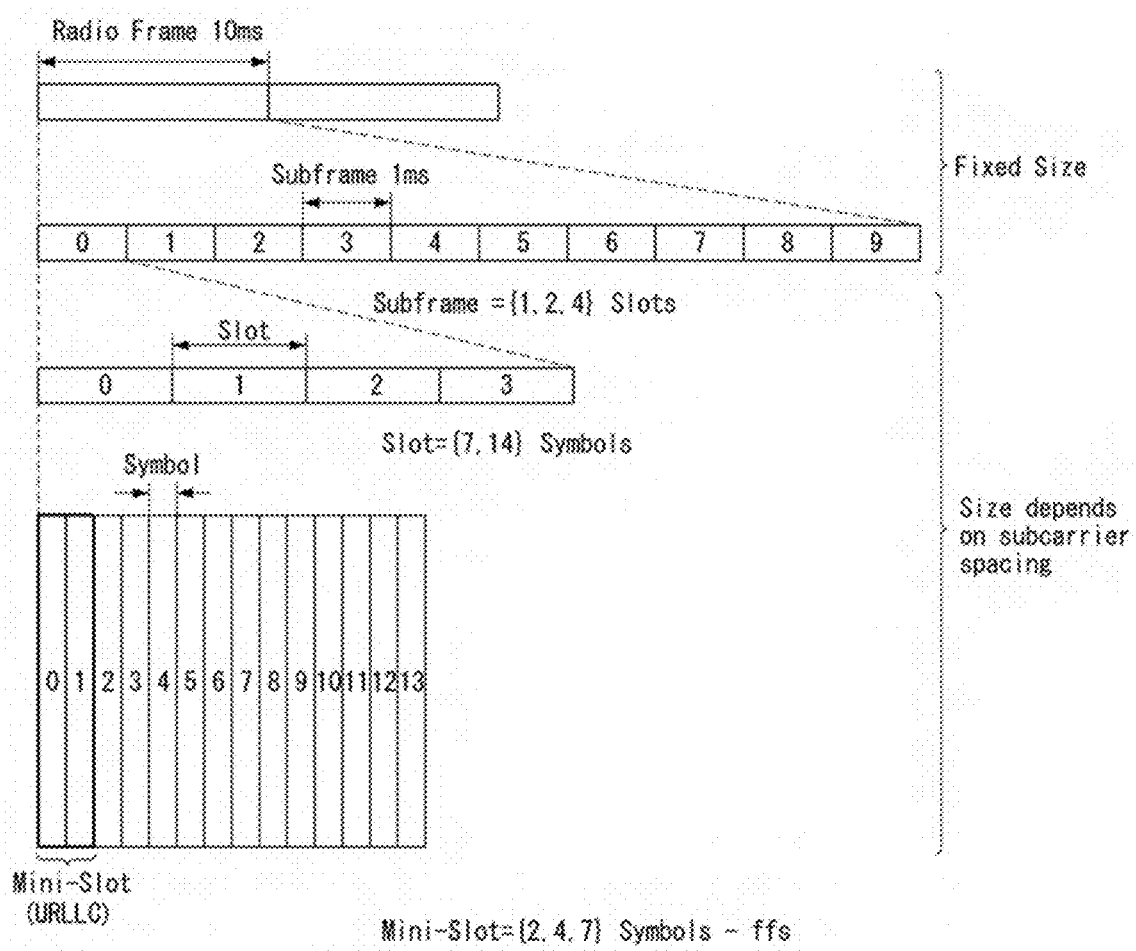

[FIG. 4]
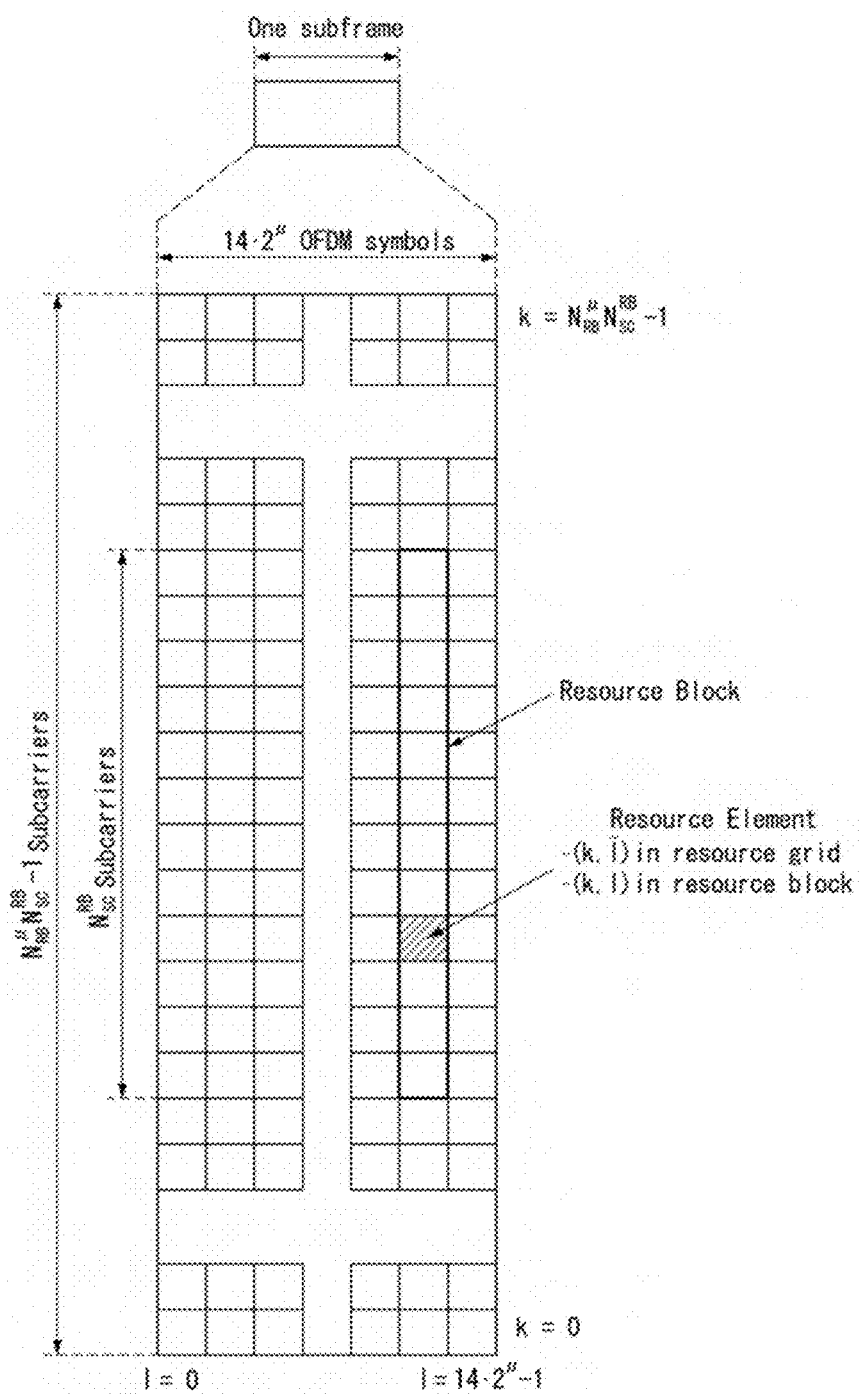

[FIG. 5]
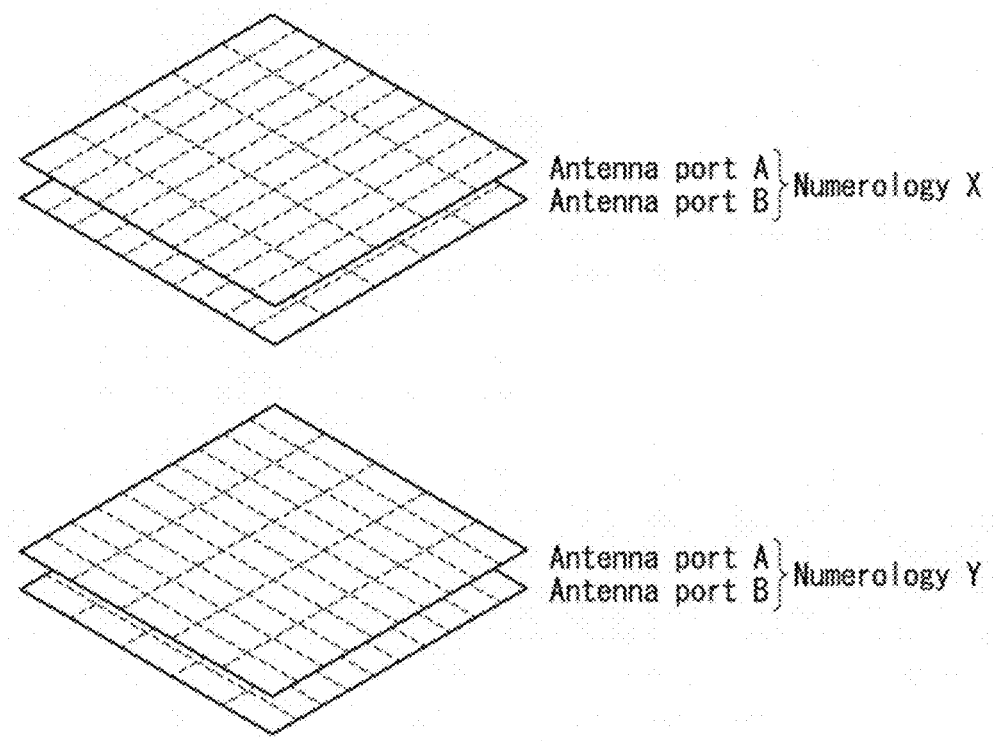

[FIG. 6]
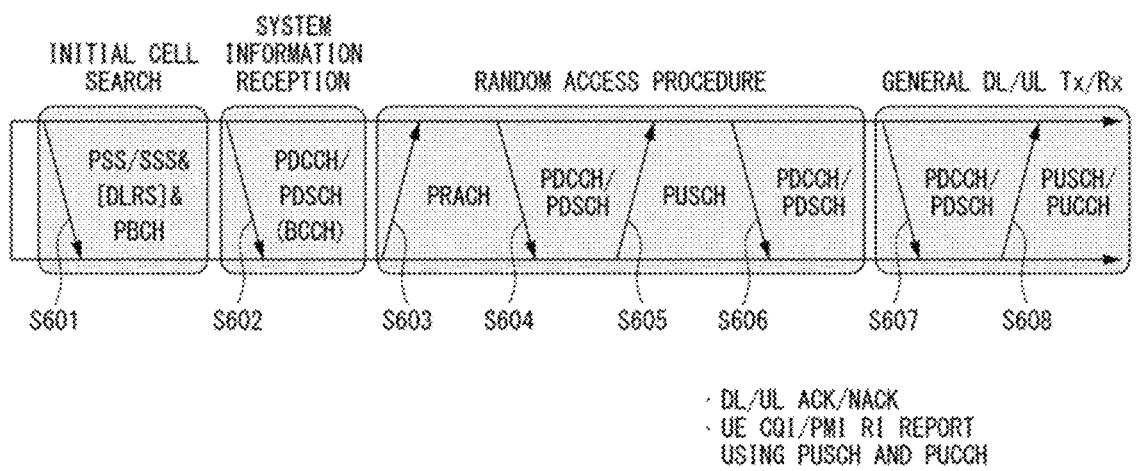

[FIG. 7]
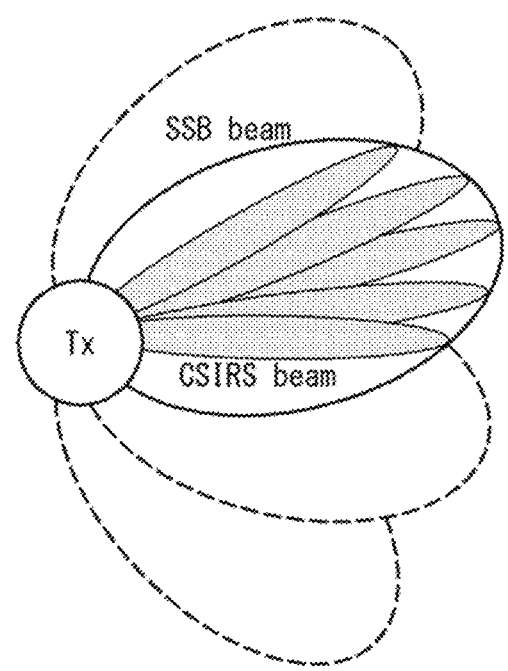

[FIG. 8]
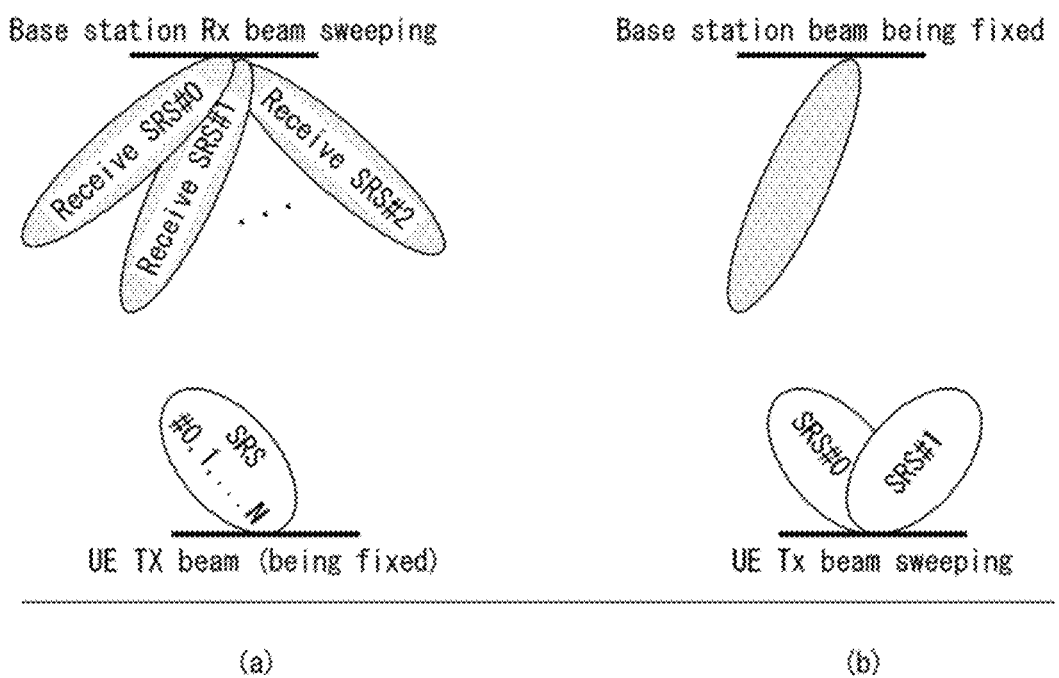

[FIG. 9]
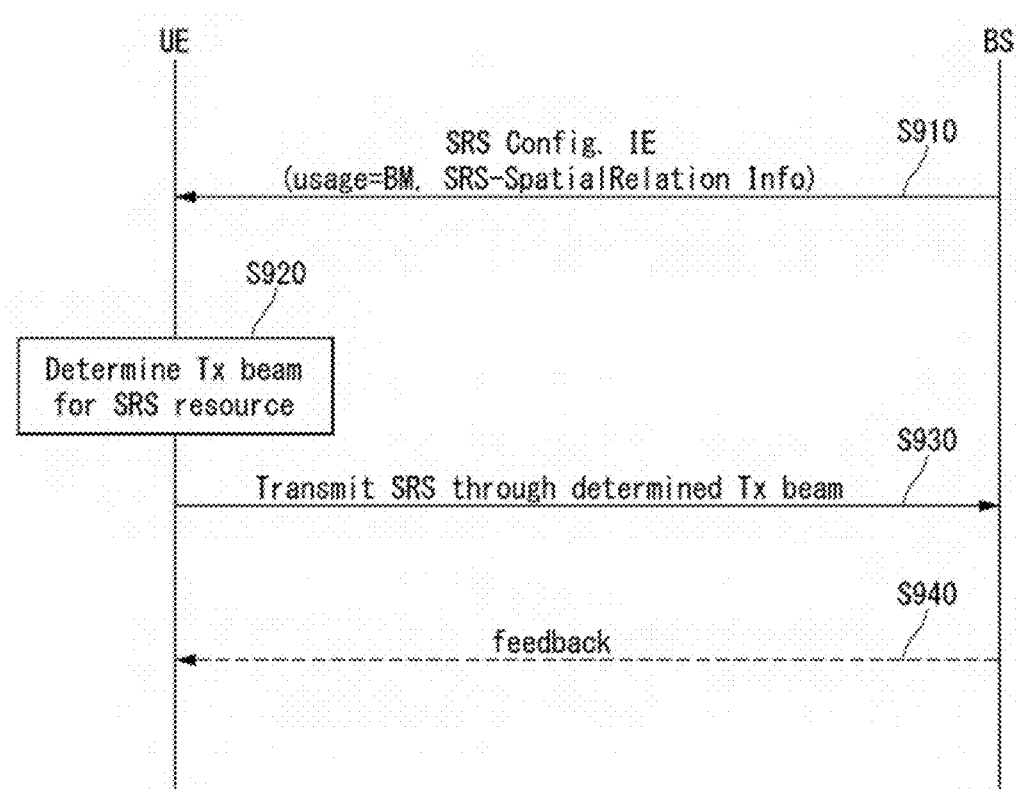

[FIG. 10]
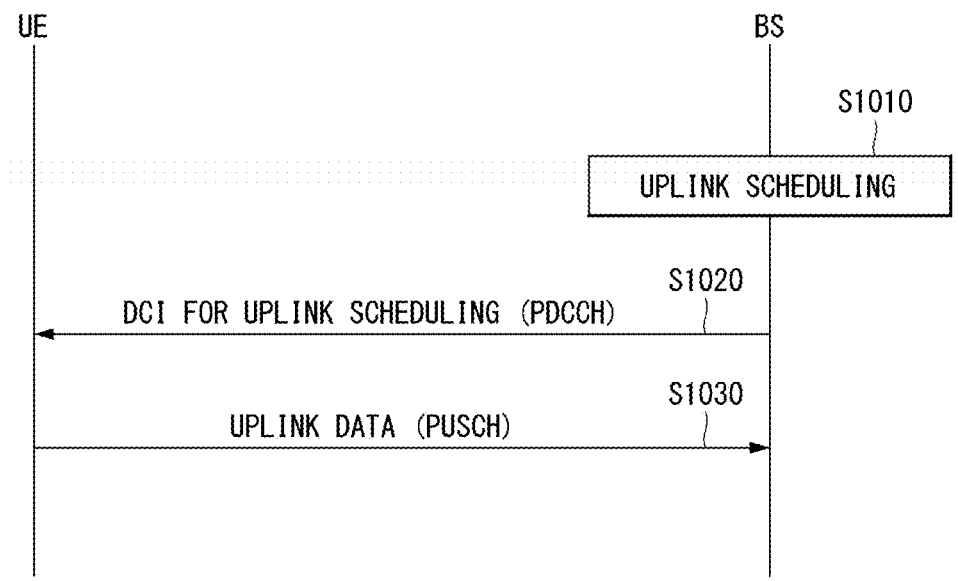

[FIG. 11]
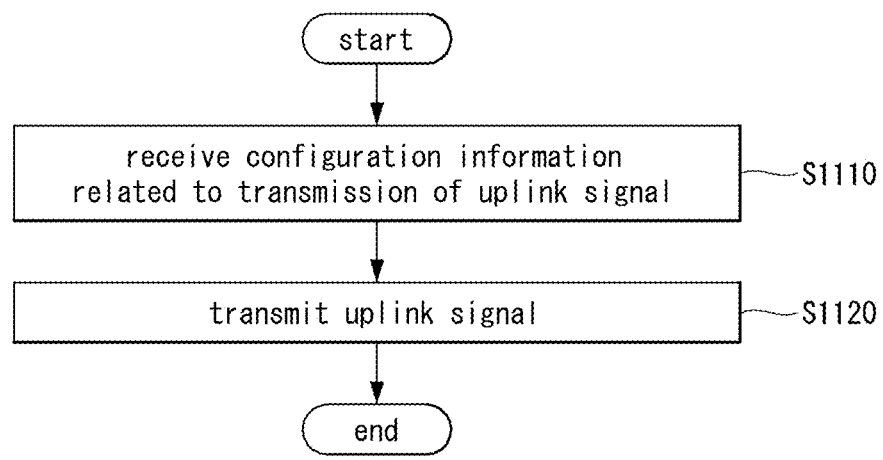

[FIG. 12]
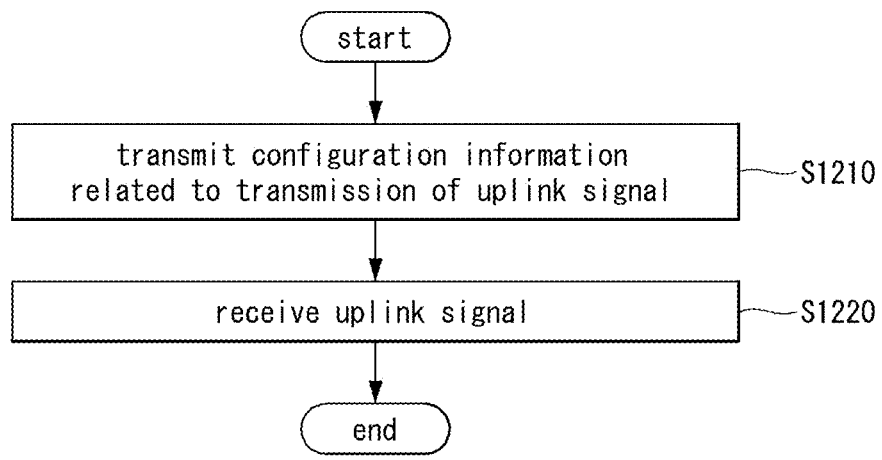

[FIG. 13]
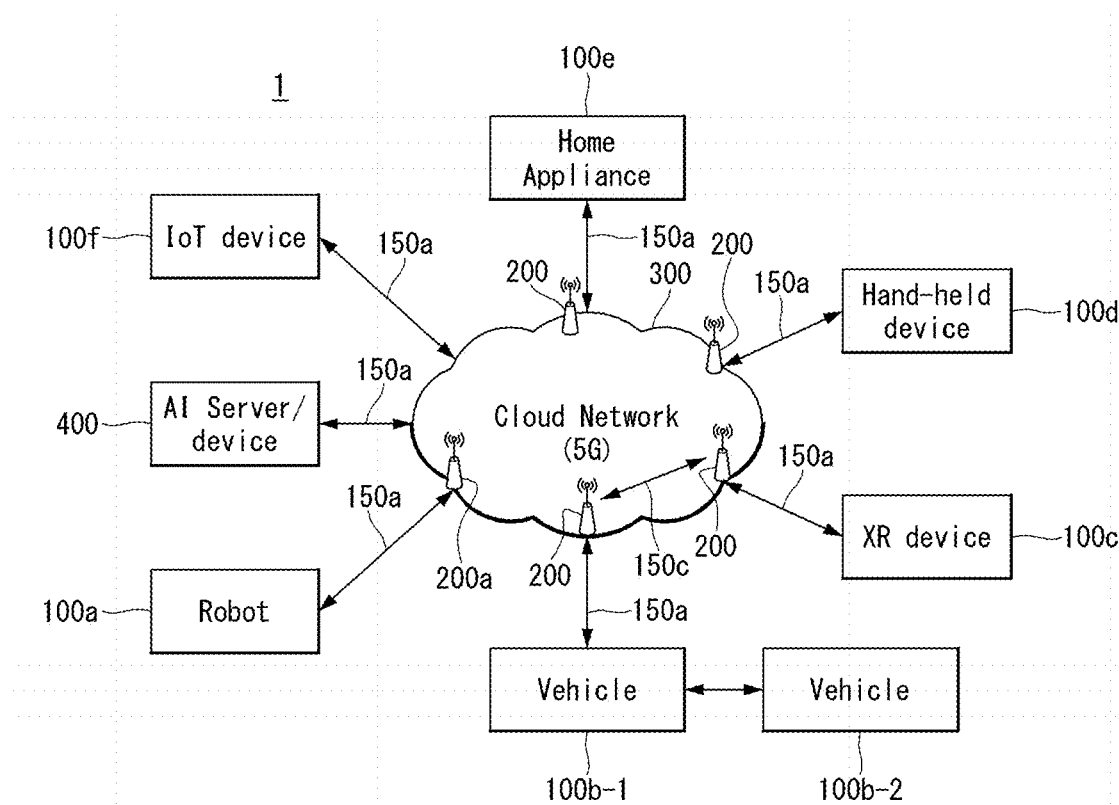

[FIG. 14]
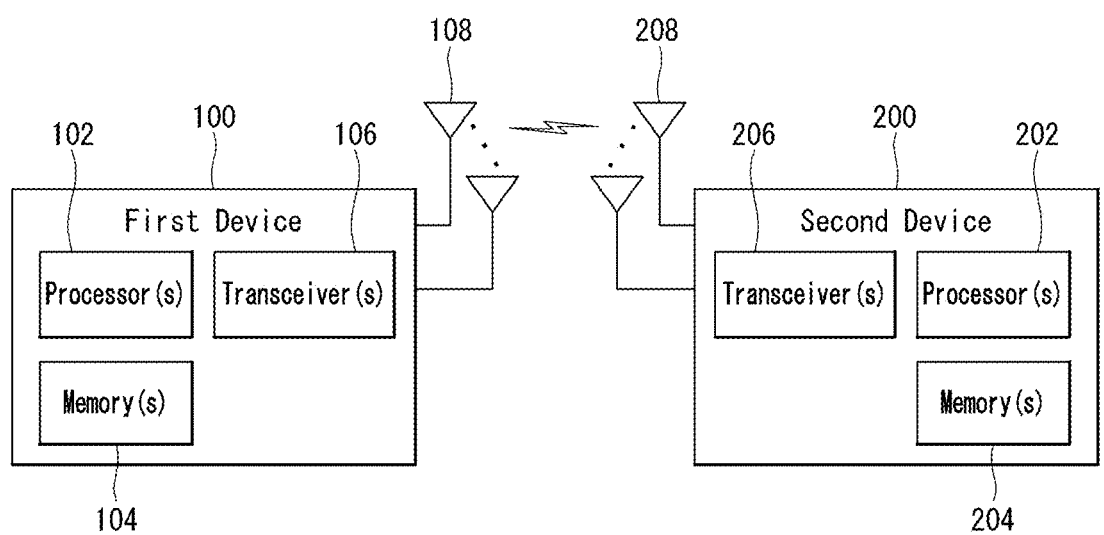

[FIG. 15]
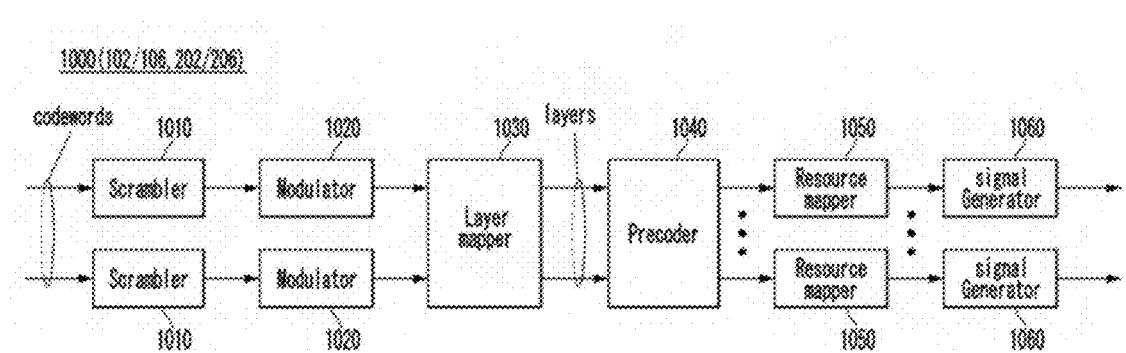

[FIG. 16]
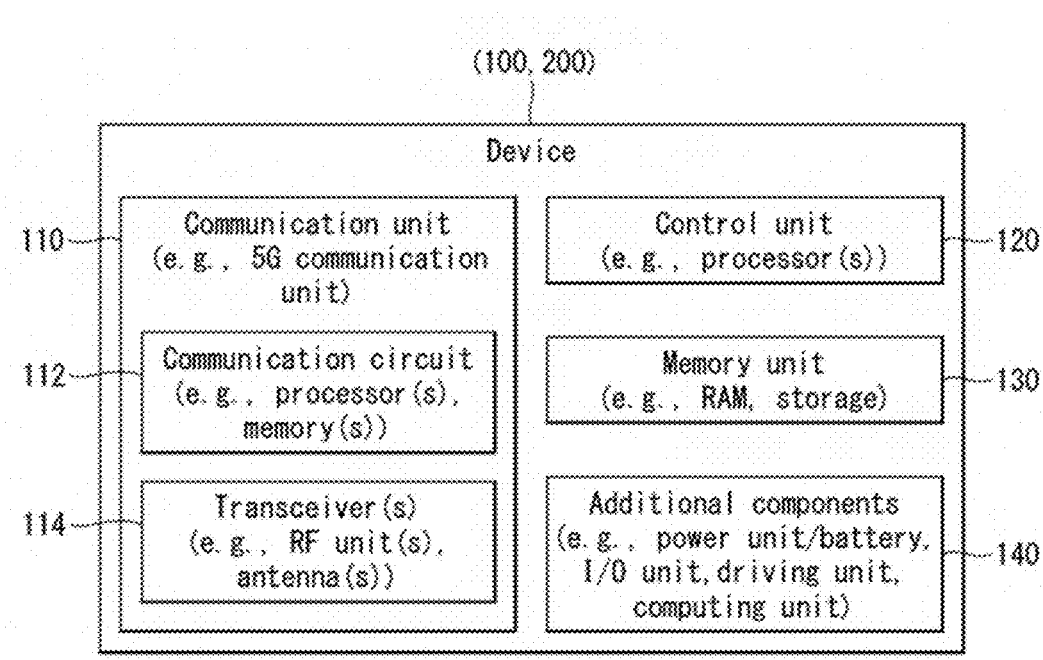

[FIG. 17]
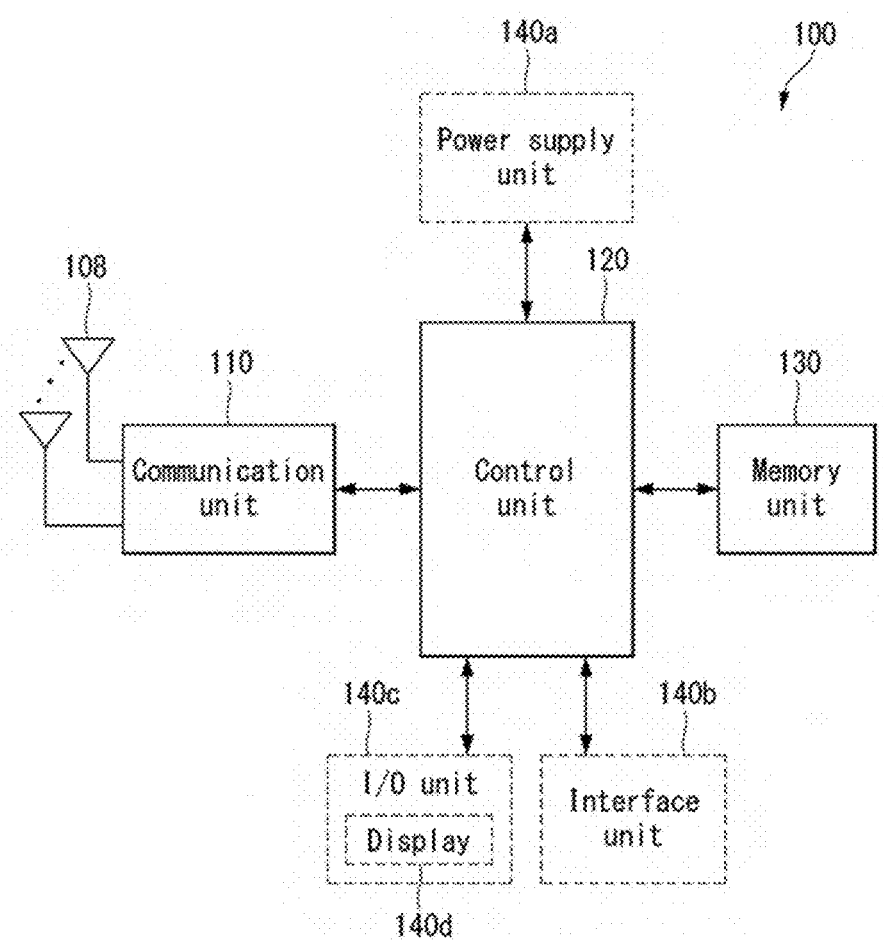

METHOD FOR TRANSMITTING AND RECEIVING UPLINK SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/004622, filed on Apr. 6, 2020, which claims the benefit of U.S. Provisional Application No. 62/830,309, filed on Apr. 5, 2019, the contents of which is hereby incorporated by reference herein in its entirety.

TECHNICAL FIELD

The present disclosure relates to a method for transmitting and receiving uplink signal in wireless communication system and an apparatus thereof.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of transmitting an uplink signal that may satisfy the Maximum Permissible Exposure (MPE) limit, while solving the problems of the existing method. Specifically, the present disclosure proposes a method of transmitting an uplink signal that satisfies the MPE limitation and prevents problems such as reduction of uplink coverage and throughput degradation.

The technical objects of the present disclosure are not limited to the aforementioned technical objects, and other technical objects, which are not mentioned above, will be apparently appreciated by a person having ordinary skill in the art from the following description.

Technical Solution

A method of transmitting an uplink signal by a user equipment (UE) in a wireless communication system according to an embodiment of the present disclosure includes receiving configuration information related to transmission of the uplink signal and transmitting the uplink signal based on the configuration information.

The configuration information includes information indicating a specific beam related to maximum permissible exposure (MPE) of a radio frequency (RF), and transmission of the uplink signal is based on the specific beam.

The specific beam may satisfy a preset condition, and the preset condition may be related to at least one of transmit power or a direction of a beam.

The transmit power of the specific beam may be smaller than or equal to a preset threshold.

A direction of the specific beam may be based on a predetermined direction.

The uplink signal may be based on a sounding reference signal (SRS) and a usage of the SRS is beam management.

Based on that spatial relation information related to transmission of the SRS is not configured, the SRS may be transmitted based on the specific beam.

The configuration information may include information indicating a plurality of candidate beams related to transmission of the uplink signal, and the specific beam may be one of the plurality of candidate beams.

The specific beam may be a beam having a highest priority among candidate beams satisfying the preset condition.

The method may further include transmitting UE capability information related to a plurality of panels, wherein the UE capability information may include information on at least one of the number of panels, whether simultaneous transmission through multiple panels is available, or a panel switching delay.

The specific beam may be based on at least one specific panel among the plurality of panels.

The specific panel may satisfy a specific condition, and the specific condition may be related to at least one of transmit power of the panel or a direction of the panel.

Based on that the UE capability information includes information indicating simultaneous transmission through multiple panels, the specific panel may include at least one of a panel whose transmit power is adjusted to satisfy the specific condition among the plurality of panels or a panel not satisfying the specific condition, and transmission of the uplink signal based on the panel not satisfying the specific condition may be dropped.

The specific panel may be based on a panel having a highest priority among panels satisfying the specific condition among the plurality of panels.

Based on that the panel switching delay for switching an activated panel to the specific panel is greater than a certain value, transmission of the uplink signal may be dropped.

A user equipment for transmitting an uplink signal in a wireless communication system according to another embodiment of the present disclosure includes one or more transceivers, one or more processors, and one or more memories configured to operably connected to the one or more processors and store instructions for performing operations when transmission of the uplink signal is executed by the one or more processors.

The operations may include receiving configuration information related to transmission of the uplink signal and transmitting the uplink signal based on the configuration information.

The configuration information may include information indicating a specific beam related to maximum permissible exposure (MPE) of a radio frequency (RF), and transmission of the uplink signal may be based on the specific beam.

A device according to another embodiment of the present disclosure includes one or more memories and one or more processors functionally connected to the one or more memories.

The one or more processors may be configured for the device to receive configuration information related to transmission of the uplink signal and transmit the uplink signal based on the configuration information.

The configuration information may include information indicating a specific beam related to maximum permissible exposure (MPE) of a radio frequency (RF), and transmission of the uplink signal may be based on the specific beam.

One or more non-transitory computer-readable mediums according to another embodiment of the present disclosure store one or more instructions.

One or more instructions executable by one or more processors may be configured to allow a user equipment to receive configuration information related to transmission of the uplink signal and transmit the uplink signal based on the configuration information.

The configuration information may include information indicating a specific beam related to maximum permissible exposure (MPE) of a radio frequency (RF), and transmission of the uplink signal may be based on the specific beam.

A method of receiving an uplink signal by a base station in a wireless communication system according to another embodiment of the present disclosure includes transmitting configuration information related to transmission of the uplink signal and receiving the uplink signal based on the configuration information.

The configuration information may include information indicating a specific beam related to maximum permissible exposure (MPE) of a radio frequency (RF), and transmission of the uplink signal may be based on the specific beam.

A base station for receiving an uplink signal in a wireless communication system according to another embodiment of the present disclosure includes one or more transceivers, one or more processors, and one or more memories configured to operably connected to the one or more processors and store instructions for performing operations when transmission of the uplink signal is executed by the one or more processors.

The operations may include transmitting configuration information related to transmission of the uplink signal and receiving the uplink signal based on the configuration information.

The configuration information may include information indicating a specific beam related to maximum permissible exposure (MPE) of a radio frequency (RF), and transmission of the uplink signal may be based on the specific beam.

Advantageous Effects

According to an embodiment of the present disclosure, an uplink signal is transmitted based on a specific beam related to a maximum permissible exposure (MPE) of a radio frequency (RF). Accordingly, the transmission of the uplink signal may be performed to satisfy the MPE limitation. The above embodiment may solve the problems associated with the existing method. Specifically, according to an embodiment of the present disclosure, since transmit power of the uplink signal is not directly limited, uplink coverage is not reduced. In addition, since the above embodiment does not impose a limit on an uplink subframe rate, signal throughput is not degraded.

According to an embodiment of the present disclosure, the specific beam is one of a plurality of candidate beams and has the highest priority among candidate beams satisfying the condition according to the MPE limitation. Since the flexibility of beam selection may be increased, preference of the UE may be considered when the uplink signal is transmitted to satisfy the MPE limitation. In addition, the reliability of uplink signal transmission may be secured according to a situation between a UE and a BS.

According to an embodiment of the present disclosure, the specific beam may be based on at least one specific panel among a plurality of panels. In the case of a terminal capable of performing simultaneous transmission through a multi-panel, transmit power of a panel that does not satisfy the condition according to the MPE limitation may be adjusted and transmitted. In the case of a UE capable of activating only one panel at a time, if a panel switching delay is greater than a predetermined value, transmission of the corresponding uplink signal may be dropped. Therefore, transmission of the uplink signal may be performed so that the condition according to the MPE limitation is satisfied even at the panel level. In addition, transmission of the uplink signal may be performed so that the MPE limitation is effectively satisfied according to the type of the multi-panel terminal.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 illustrates an uplink transmission/reception operation to which the method proposed in this disclosure may be applied.

FIG. 11 is a flowchart illustrating a method of a terminal to transmit an uplink signal in a wireless communication system according to an embodiment of the present disclosure.

FIG. 12 is a flowchart illustrating a method of a base station to receive an uplink signal in a wireless communication system according to another embodiment of the present disclosure.

FIG. 13 illustrates a communication system 1 applied to the present disclosure.

FIG. 14 illustrates wireless devices applicable to the present disclosure.

FIG. 15 illustrates a signal process circuit for a transmission signal.

FIG. 16 illustrates another example of a wireless device applied to the present disclosure.

FIG. 17 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) a ULtra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.
gNB: A node which supports the NR as well as connectivity to NGC.
New RAN: A radio access network which supports either NR or E-UTRA or interfaces with the NGC.
Network slice: A network slice is a network defined by the operator customized to provide an optimized solution for a specific market scenario which demands specific requirements with end-to-end scope.
Network function: A network function is a logical node within a network infrastructure that has well-defined external interfaces and well-defined functional behavior.
NG-C: A control plane interface used at an NG2 reference point between new RAN and NGC.
NG-U: A user plane interface used at an NG3 reference point between new RAN and NGC.
Non-standalone NR: A deployment configuration where the gNB requires an LTE eNB as an anchor for control plane connectivity to EPC, or requires an eLTE eNB as an anchor for control plane connectivity to NGC.
Non-standalone E-UTRA: A deployment configuration where the eLTE eNB requires a gNB as an anchor for control plane connectivity to NGC.
User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.
The gNBs are connected to the NGC via the NG interface.
More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology, μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$ and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, $2^{\mu}N_{symb}^{(\mu)}$ OFDM symbols, where $N_{RB}^{\mu} \leq N_{RB}^{max,\mu} N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, . . . , $N_{RB}^{\mu}N_{sc}^{RB}-1$ is an index on a frequency domain, and l=0, . . . , $2^{\mu}N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l) for the numerology μ and the antenna port p corresponds to a complex value $\alpha_{k,l}^{(p,\mu)}$. When there is no risk for confusion or when a specific antenna port or numerology is not specified, the indexes p and μ may be dropped, and as a result, the complex value may be $\alpha_{k,l}^{(p)}$ or $\alpha_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k,l) for the subcarrier spacing configuration μ may be given by the following Equation 1.

$$n_{CRB}^{\mu} = \left\lfloor \frac{k}{N_{sc}^{RB}} \right\rfloor \quad [\text{Equation 1}]$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad [\text{Equation 2}]$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State :: =                SEQUENCE {
  tci-StateId                   TCI-StateId
  qcl-Type1                     QCL-Info,
  qcl-Type2                     QCL-Info
  ...
}
QCL-Info ::=                  SEQUENCE {
  cell                          ServCellIndex
  bwp-Id                        BWP-Id
  referenceSignal               CHOICE {
    csi-rs                        NZP-CSI-RS-ResourceId,
    ssb                           SSB-Index
  },
  qcl-Type                      ENUMERATED {typeA, typeB, typeC,
                                typeD},
  ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8 illustrates an example of a UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of a UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                        SEQUENCE {
    srs-ResourceSetToReleaseList          SEQUENCE (SIZE(1..maxNrofSRS-
ResourceSets)) OF SRS-ResourceSetId       OPTIONAL,   -- Need N
    srs-ResourceSetToAddModList           SEQUENCE (SIZE(1..maxNrofSRS-
ResourceSets)) OF SRS-ResourceSet         OPTIONAL,   -- Need N
    srs-ResourceToReleaseList             SEQUENCE (SIZE(1..maxNrofSRS-
Resources)) OF SRI-ResourceId             OPTIONAL,   -- Need N
    srs-ResourceToAddModList              SEQUENCE (SIZE(1..maxNrofSRS-
```

TABLE 6-continued

```
Resources)) OF SRI-Resource          OPTIONAL,    -- Need N
    tpc-Accumulation                 ENUMERATED {disabled}
    ...
}
SRS-ResourceSet ::=                  SEQUENCE {
    srs-ResourceSetId                SRS-ResourceSetId,
    srs-ResourceIdList               SEQUENCE (SIZE (1..maxNrofSRS-
ResourcesPerSet)) OF SRS-ResourceId  OPTIONAL, -- Cond Setup
    resourceType                     CHOICE {
        aperiodic                    SEQUENCE {
            aperiodicSRS-ResourceTrigger    INTEGER (1..maxNrofSRS-
TriggerStates-1),
            csi-RS                   NZP-CSI-RS-ResourceId
            slotOffset               INTEGER (1..32)
            ...
        },
        semi-persistent              SEQUENCE {
            associatedCSI-RS             NZP-CSI-RS-ResourceId
            ...
        },
        periodic                     SEQUENCE {
            associatedCSI-RS             NZP-CSI-RS-ResourceId
            ...
        }
    },
    usage                            ENUMERATED {beamManagement,
codebook, nonCodebook, antennaSwitching},
    alpha                            Alpha
    p0                               INTEGER (-202..24)
    pathlossReferenceRS              CHOICE {
        ssb-Index                    SSB-Index,
        csi-RS-Index                 NZR-CSI-RS-ResourceId
SRS-SpatialRelationInfo ::=          SEQUENCE {
    servingCellId                    ServCellIndex
    referenceSignal                  CHOICE {
        ssb-Index                    SSB-Index,
        csi-RS-Index                 NZP-CSI-RS-ReeourceId,
        srs                          SEQUENCE {
            resourceId                   SRS-ResourceId,
            uplinkBWP                    BWP-Id
        }
    }
}
SRS-ResourceId ::=                   INTGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':
i) if SRS-SpatialRelationInfo is set to SSB/PBCH,' the UE transmits the corresponding SRS resource with the same spatial domain transmission filter (or generated from the corresponding filter) as the spatial domain Rx filter used for the reception of the SSB/PBCH; or
ii) if SRS-SpatialRelationInfo is set to 'CSI-RS,' the UE transmits the SRS resource with the same spatial domain transmission filter used for the reception of the periodic CSI-RS or SP CSI-RS; or
iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to SP-SRS' or 'AP-SRS,' the beam determination and transmission operations may be applied similar to the above.

Additionally, the UE may receive or may not receive feedback for the SRS from the base station, as in the following three cases in S940.
i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 10 illustrates an uplink transmission/reception operation to which the method proposed in this disclosure may be applied.

Referring to FIG. 10, a BS schedules uplink transmission such as a frequency/time resource, a transport layer, an uplink precoder, and an MCS (S1010). In particular, the BS may determine a beam for a UE to transmit a PUSCH.

The UE receives a DCI for uplink scheduling (i.e., including scheduling information of the PUSCH) on a PDCCH from the BS (S1020).

For uplink scheduling, DCI format 0_0 or 0_1 may be used. In particular, DCI format 0_1 includes the following information.

DCI format identifier (identifier for DCI formats), UL/SUL (supplementary uplink) indicator (UL/SUL indicator), bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, uplink shared channel (UL-SCH) indicator.

In particular, SRS resources configured in the SRS resource set associated with the higher layer parameter 'usage' may be indicated by an SRS resource indicator field. In addition, spatialRelationInfo' may be set for each SRS resource, and the value may be one of {CRI, SSB, SRI}.

The UE transmits uplink data to the BS on PUSCH (S1030).

When the UE detects a PDCCH including DCI format 0_0 or 0_1, it transmits a corresponding PUSCH according to an indication by the corresponding DCI.

For PUSCH transmission, two transmission schemes are supported: codebook-based transmission and non-codebook-based transmission.

i) When the higher layer parameter 'txConfig' is set to 'codebook', the UE is set to codebook-based transmission. Meanwhile, when the higher layer parameter 'txConfig' is set to 'nonCodebook', the UE is set to non-codebook-based transmission. If the higher layer parameter 'txConfig' is not set, the UE does not expect to be scheduled by DCI format 0_1. When the PUSCH is scheduled by DCI format 0_0, PUSCH transmission is based on a single antenna port.

In the case of codebook-based transmission, the PUSCH may be scheduled by DCI format 0_0, DCI format 0_1 or semi-statically. When the PUSCH is scheduled by DCI format 0_1, the UE determines a PUSCH transmission precoder based on SRI, TPMI (Transmit Precoding Matrix Indicator) and transmission rank from DCI, as given by the SRS resource indicator field and the precoding information and number of layers field. The TPMI is used to indicate a precoder to be applied across an antenna port, and corresponds to an SRS resource selected by the SRI when multiple SRS resources are configured. Alternatively, when a single SRS resource is configured, the TPMI is used to indicate a precoder to be applied across the antenna port and corresponds to the single SRS resource. A transmission precoder is selected from the uplink codebook having the same number of antenna ports as the higher layer parameter 'nrofSRS-Ports'.

When the higher layer parameter 'txConfig' set to 'codebook' in the UE is configured, at least one SRS resource is configured in the UE. The SRI indicated in slot n is associated with the latest transmission of the SRS resource identified by the SRI, and here, the SRS resource precedes a PDCCH carrying the SRI (i.e., slot n).

ii) In the case of non-codebook-based transmission, the PUSCH may be scheduled by DCI format 0_0, DCI format 0_1 or semi-statically. When multiple SRS resources are configured, the UE may determine the PUSCH precoder and transmission rank based on the wideband SRI, and here, the SRI is given by the SRS resource indicator in the DCI or by the higher layer parameter 'srs-ResourceIndicator'. The UE uses one or multiple SRS resources for SRS transmission, and here, the number of SRS resources may be configured for simultaneous transmission within the same RB based on UE capability. Only one SRS port is configured for each SRS resource. Only one SRS resource may be set as the higher layer parameter 'usage' set to 'nonCodebook'. The maximum number of SRS resources that may be configured for non-codebook-based uplink transmission is 4. The SRI indicated in slot n is associated with the latest transmission of the SRS resource identified by the SRI, and here, the SRS transmission precedes the PDCCH carrying the SRI (i.e., slot n).

The above content may be applied in combination with the methods proposed in the present disclosure to be described later or may be supplemented to clarify the technical characteristics of the methods proposed in the present disclosure. Of course, the methods described below are only divided for convenience of description, and some components of one method may be substituted with some components of another method or may be applied in combination with each other.

In Rel-15, the PUSCH beam indication of the UE is configured through the SRI field of the UL DCI as described above, and the corresponding procedure may be described based on a case where beam correspondence is or is not established.

If beam correspondence is not established, a UL beam management operation for finding an optimal UL analog beam is performed by using a plurality of resources of an SRS resource set whose usage is 'BM'.

As a result of UL beam management (UL BM) operation, the resource(s) determined as an optimal UL analog beam is linked to 'SRS-SpatialRelationInfo' of resources belonging to the SRS resource set of 'CB' or 'non-CB'. The UE may transmit the SRS whose usage is 'CB' or 'non-CB' to the corresponding analog beam and receive an indication of link adaptation and modulation and coding scheme (MCS)/rank indicator (RI)/transmitted precoding matrix indicator (TPMI).

Finally, resource belonging to the SRS resource set having 'CB' or 'non-CB' are set as candidates for PUSCH beam indication through one or two SRS resource indicators (SRI). The procedure may be based on RRC signaling.

As described above, a PUSCH beam indication is made through the SRI field of the UL DCI for PUSCH scheduling. In order for the PUSCH beam indication to be effective, the following operation should be preceded. Specifically, a resource belonging to an SRS resource set configured through an SRI field should be transmitted (i.e., SRS transmission) at least once before transmission of the UL DCI.

Next, when the beam correspondence is established, the UL beam management (UL BM) operation is omitted, and DL RS ID (CSI-RI/SSB-RI) is configured in 'SRS-SpatialRelationInfo' of resource(s) of the SRS resource set whose usage is 'CB' or 'non-CB'. A UL analog beam corresponding to a DL beam may be configured through an SRI field. Even in this case, the resource belonging to the SRS resource set that is the corresponding 'CB' or 'non-CB' should be SRS transmitted at least once before transmission of the UL DCI including the SRI indication.

In the case of a PUCCH beam in Rel-15, a beam is determined by PUCCH-'SpatialRelationInfo' according to the RRC configuration. RS that may be set to PUCCH-'SpatialRelationInfo' of PUCCH beam may include DL RS (CSI-RI/SSB-RI) and SRS resource like RS for determining SRS beam (SRS resource).

Hereinafter, agreements related to multi-beam enhancement which may be applied to the method proposed in the present disclosure will be described.

1. Agreement (Panel-Specific UL Transmission)

In Rel-16, an identifier (ID) is supported, which may be used for representing the panel-specific UL transmission. The corresponding identifier may be utilizing or modifying an existing definition. Alternatively, the corresponding identifier may be newly defined.

2. Agreement (Number of Spatial Relations for PUCCH)

For UL beam management latency reduction in controlling PUCCH spatial relation, the maximum RRC configurable number of spatial relations for PUCCH (i.e., maxNrofSpatialRelationInfos) is increased to be 64 per BWP.

3. Agreement (ID for Panel-Specific UL Transmission)

The identifier (ID) which may be used for representing the panel-specific UL transmission may be one of the following Alt.1 to Alt.4.

Alt.1: SRS resource set ID
Alt.2: ID, which is directly associated to a reference RS resource and/or resource set
Alt.3: ID, which is directly associated to a reference RS resource and/or resource set
Alt.4: ID which is additionally configured in spatial relation info The multi-panel UE (MPUE) may be classified as follows.

MPUE-Assumption1: Multiple panels are implemented on a UE and only one panel may be activated at a time, with panel switching/activation delay of [X] ms.

MPUE-Assumption2: Multiple panels are implemented on a UE and multiple panels may be activated at a time and one or more panels may be used for transmission.

MPUE-Assumption3: Multiple panels are implemented on a UE and multiple panels may be activated at a time but only one panel may be used for transmission.

As described above, a multi-panel UE may be classified into the following three types.

A UE that cannot activate multiple panels at the same time and may activate only one panel at a time. The corresponding UE may be based on the MPUE-assumption 1.

A UE capable of simultaneously activating multiple panels and using one or multiple panels during transmission. The corresponding UE may be based on the MPUE-assumption 2.

A UE that may activate multiple panels at the same time, but may use only one panel during transmission. The corresponding UE may be based on the MPUE-assumption 3.

The proposals to be described below may be proposals applicable only to one type of UE among the three types of UEs, or conversely, may correspond to two types of UEs or three types of UEs.

Hereinafter, matters related to the maximum permissible exposure limitation (MPE) will be discussed.

A default value of maxUplinkDutyCycle may be considered to meet MPE regulatory requirements.

Table 7 below shows the general public RF maximum permissible exposure limits above the frequency $f_{tr}$. In Table 7, the frequency unit is GHz.

TABLE 7

| | FCC | | ICNIRP | |
|---|---|---|---|---|
| | 'Old' | 'New' | 'Old' | 'New' (Reference levels) |
| $f_{tr}$ (GHz) | 6 | 6 | 10 | 6 |
| Incident power density (W/m$^2$) f ≥ $f_{tr}$ | 10 | 10 | 10 | $55 * f^{-0.177}$ 30 (at 28 GHz) 28 (at 39 GHz) |
| Averaging area | 1 cm$^2$ | 4 cm$^2$ | 20 cm$^2$ | 4 cm$^2$ up to 30 GHz and 1 cm$^2$ above |

Referring to Table 7 above, the regulations of the FCC at 28 GHz are stricter than the ICNIRP restrictions.

To measure the RF exposure level of the human body, two antenna panels and 4Tx antenna elements per panel may be considered as shown in Table 8 below. Table 8 below illustrates parameters of an NR UE for measuring the RF exposure level.

TABLE 8

| UE parameters | Unit | |
|---|---|---|
| Operating band | | n260/n261 |
| # of antenna in an array (# of patches, # of dipoles, etc.) | | One 2 × 2 patch |
| #of arrays in total | | 2 |
| Antenna type (patch, dipole, or both) | | patch |
| Antenna location (front, back, top-side, left-side, right-side, bottom-side) | | Left & Right |
| Device case material (Plastic, Glass, Ceramic, Metal) | dB | Metal |
| Device size (3D) | cm$^3$ | Over 150 mm of length |
| Legacy Antenna (w/Metal, Plastic Frame) | | Plastic |
| Display panel | Y/N | Y |
| Bezel Margin | Y/N | N/A |
| Gap between antenna & housing | mm | N/A |

The RF exposure level of the NR UE measured in the n261/n260 operating bands based on the contents described above is shown in Table 9 below.

TABLE 9

| Operating Band | Measured Condition | Test Distance | Test Grid Size | UplindDuty Cycle | CH | | | AG0 + AG1 EIRP | Avg. Area [4 cm^2] PD(W/m^2) |
|---|---|---|---|---|---|---|---|---|---|
| n261 | left side | 0 mm | 20 × 20 mm | 50.0% | Low | AG0 | AG1 | 20.4 | 21.6 |
| n261 | Front | 0 mm | 20 × 20 mm | 50.0% | Low | (H) | (V) | 20.4 | 10.2 |
| n261 | Rear | 0 mm | 20 × 20 mm | 50.0% | Low | | | 20.4 | 8.7 |
| n261 | Left side | 0 mm | 20 × 20 mm | 25% | Low | | | 17.4 | 10.8 |
| n261 | Front | 0 mm | 20 × 20 mm | 25% | Low | | | 17.4 | 5.03 |
| n261 | Rear | 0 mm | 20 × 20 mm | 25% | Low | | | 17.4 | 4.45 |
| n261 | Left side | 0 mm | 20 × 20 mm | 12.5% | Low | | | 14.4 | 5.4 |
| n261 | Front | 0 mm | 20 × 20 mm | 12.5% | Low | | | 14.4 | 2.54 |
| n261 | Rear | 0 mm | 20 × 20 mm | 12.5% | Low | | | 14.4 | 2.2 |
| n261 | Left side | 0 mm | 20 × 20 mm | 6.25% | Low | | | 11.4 | 2.8 |
| n260 | Left side | 0 mm | 20 × 20 mm | 50% | Low | | | 19.6 | 14.8 |
| n260 | Front | 0 mm | 20 × 20 mm | 50% | Low | | | 19.6 | 4.9 |
| n260 | Rear | 0 mm | 20 × 20 mm | 50% | Low | | | 19.6 | 4.2 |
| n260 | Left side | 0 mm | 20 × 20 mm | 25% | Low | | | 16.6 | 7.3 |
| n260 | Front | 0 mm | 20 × 20 mm | 25% | Low | | | 16.6 | 2.4 |
| n260 | Rear | 0 mm | 20 × 20 mm | 25% | Low | | | 16.6 | 2.0 |

Based on Table 9, the total required power reduction level is about 6 dB.

In order to meet the MPE regulatory requirements, the UE operation according to the following options 1 to 3 (operation of the NR UE of FR2) may be considered.

Option 1) Apply 6 dB P-MPR only without maxUplinkDutyCycle restrictions

Option 2) Apply 20% maxUplinkDutyCycle only without P-MPR

Option 3) Apply both P-MPR (power management-Maximum Power reduction) and maxUplinkDutyCycle Here, an example of the limitation of maxUplinkDutyCycle may be the application of the default value described above. The P-MPR may be a power control parameter for limiting the maximum power.

Referring to Table 10 below, the pros and cons of the options described above are described. Table 10 shows the pros and cons of candidate solutions for MPE regulation.

TABLE 10

| Solution | Pros | Cons |
|---|---|---|
| Option 1 | TDD UL/DL configuration is not limited UEs released in early stages may easily meet MPE regulations | Cell coverage is reduced Initial access is limited. RAN 2 signaling for P-MPR report from UE is not supported |
| Option 2 | Cell coverage is maintained Initial access is not limited RAN 2 signaling for reporting of maxUplinkDutyCycle from the UE is supported UEs released in early stages may easily meet MPE regulations | TDD UL/DL configuration is limited |
| Option 3 | MPE regulations are easily satisfied | RAN 2 signaling for P-MPR reporting from UE is not supported Initially released UEs do not provide any information on P-MPR and maxUplinkDutyCycle to network. |

MPE (Maximum Permissible Exposure), which may be harmful to the human body, needs to be considered as an analog beam is used to target FR2 in NR. A solution as described above is proposed for a case in which a beam of the UE violates the corresponding MPE limitation.

A first method is a P-MPR (Power Management Maximum Power Reduction) method that meets the MPE limitations in the form of direct power backoff (backoff) A second method is a method to satisfy the MPE limitation by defining maxUplinkDutyCycle and limiting a portion that may be used for uplink (UL) in a time axis.

In the case of the two solutions, uplink coverage (UL coverage) may be reduced by directly backing off power and there are restrictions on the portion for uplink transmission (that is, the number of uplink subframes), which may degrades throughput.

The present disclosure proposes the following methods in configuring/indicating a UL beam of a BS and determining a UL beam of a UE in order to solve the problem described above. Specifically, the present disclosure proposes an enhanced beam management scheme considering WIPE and a UL beam configuration/instruction/determination scheme.

Hereinafter, methods for a single-panel/multi-panel UE will be described. Specifically, a method of configuring/indicating a UL beam of a BS in consideration of MPE and a method of operating a UE/BS according to the method will be described.

[Proposal 1]

SRS transmission in the SRS resource set of the BM purpose of which the usage is "beamManagement" may be performed as follows.

In Rel-15 NR, in the SRS resource in the SRS resource set whose usage is "beamManagement", whether to configure spatialRelationInfo is optional. When spatialRelationInfo is not configured, an SRS transmission method in the corresponding SRS resource may vary depending on the UE implementation method of the UL beam. As an example, the UE may perform a UL beam management process through arbitrary beam sweeping. The BS may utilize a PUSCH beam by indicating an optimal UL beam through SRI or utilize a PUCCH beam through RRC configuration.

If there is no spatialRelationInfo configuration in the SRS resource in the SRS resource set whose usage is "beamManagement" as described above, the UE transmits the SRS as follows in consideration of the MPE issue.

The UE may transmit the SRS (in the UL beam management process) through a beam based on at least one of i) or ii) below.

i) a UL beam in which transmit power does not exceed a specific threshold (hereinafter, referred to as 'MPE threshold' for convenience of description)

ii) a UL beam rather than a beam directed to the human body

The specific threshold may be a predefined/set/indicated value. Whether the beam is directed to the human body may be determined based on a previously acquired value (e.g., sensor data acquired based on a sensor operation).

The conditions according to i) and ii) may be referred to as MPE conditions in this disclosure.

As described above, in the arbitrary SRS beam sweeping of the UE for UL beam management, a beam candidate used for transmission of PUCCH or PUSCH may include only beams not harmful to the human body.

As an example, the 'MPE threshold' may be determined as a specific (amount of power, e.g., X dB(m)) value(s) fixed by a standard/regulation or the like. As another example, the MPE threshold may be determined by a value configured/indicated (e.g., higher layer signaling through RRC, MAC CE or DCI) by the BS based on the specific capability information of the UE and/or the report of the specific capability information.

[Proposal 2]

Hereinafter, a method of configuring/indicating a plurality of candidate UL beams in a paired form in a UL beam indication of a BS will be described.

Fields for determining a beam of PUCCH and PUSCH may include two or more spatial relation sources.

Specifically, a field for indicating a UL beam may include RRC configuration 'PUCCH-SpatialRelationInfo', SRI field, and uplink TCI field (in a case in which a UL TCI introduces a reception beam corresponding to DL RS by applying it to a UL beam to directly use it).

In this case, two or more spatial relation sources may be configured in a paired form in the field. Specifically, two or more spatial relation sources (e.g., first beam, second beam, third beam), rather than configuring one spatial relation source, may be set in a paired form in the field.

A case in which a first beam to a third beam is configured in the field will be described as an example. When the first beam is a beam that does not correspond to i) or ii) of the aforementioned proposal 1, the UE may transmit the SRS based on the second beam or the third beam. Specifically, if a UL signal transmit power value/level (e.g., (L1-)RSRP) of the first beam exceeds the MPE threshold or the first beam (acquired through sensor data) is directed toward the human body, the UE may use a second beam or a third beam as a UL beam.

In RRC description of RRC configuration PUCCH-SpatialRelationInfo' and SRI field (SRI field) and RRC description for each codepoint of the UL TCI field (RRC description) (and/or MAC CE signaling), two or more UL beams, rather than only one candidate UL beam being defined/configured, may be defined/configured.

Taking the SRI field as an example, two or more UL beams may be configured as candidates to '0' and two or more UL beams are also configured to '1' in a 1-bit SRI field. If '0' is set in PUSCH transmission through the SRI field of UL DCI and the first beam violates the specific MPE issue/operation/condition, the second beam is used/applied, and if the second beam also violates, third and fourth beams may also be configured to be utilized/applied.

In addition, a specific/separate UE capability reporting operation may be performed on whether two or more candidate UL beams are defined/configured. The two or more candidate UL beams (UL beams) may be defined/configured in the form of priorities such as first preference, second preference, and third preference.

The embodiment according to the above proposal 2 may be used as a method of solving the MPE issue, but is not limited thereto. The embodiment according to the above proposal 2 may be utilized for other purposes as well.

As an example, the embodiment may be applied in a special situation in which a beam indication by UL beam preference of a BS is not absolute. Specifically, based on the above embodiment, the UE may determine a UE preference UL beam by itself (and/or as part of a UE-assisted/aided/triggered beam management operation). That is, the UE may determine, as the UE preference UL beam, any one of spatial relation sources (e.g., first beam, second beam, third beam, . . . ) configured through the UL beam candidate group (RRC (and/or MAC CE signaling) of UE) of the proposal 2. The UE may transmit an uplink signal based on the determined beam.

[Proposal 3]

Hereinafter, a method of configuring/indicating a panel/beam (considering MPE) in a multi-panel UE (multi-panel UE) will be described.

In the case of 1) or 2) below in a multi-panel UE, the following operations may be defined/configured/indicated.

1) When the UL signal transmit power value/level (eg (L1-)RSRP) of the panel/beam for uplink transmission indicated by the BS exceeds an MPE threshold
2) When the panel/beam for uplink transmission indicated by the BS is a panel/beam directed toward the human body In the case of 1) or 2), the UE may transmit an uplink signal through a panel other than the indicated panel.

In a case where the number of panels of the UE is three or more in the above operation, the operation of applying the replacement panel may be based on a preset priority (e.g., priority in the form of first prioritized panel, second prioritized panel, and third prioritized panel). The priority may be set based on the related information reporting operation of the UE and/or the configuring/indicating operation of the BS. A default/pre-defined/pre-configured UL beam may be defined for each panel to be replaced.

Specifically, in the case of a UE that may utilize only one panel at the time of transmission of a specific uplink signal, such as the MPUE-assumption 1 or the MPUE-assumption 3, the UE may operate not to violate the MPE condition through panel switching. However, in the case of a UE having a large delay in panel switching as in MPUE-assumption 1, the panel switching operation may not be completed until an uplink channel transmission timing set/indicated by the BS. In this case, the UE may operate according to proposal 2 based on the corresponding panel or drop the configured/indicated uplink channel transmission (when the operation of proposal 2 is not supported).

In the case of a UE that may utilize one or more panels at the time of transmission, such as MPUE-assumption 2, it may operate as follows. When multiple panels are configured/indicated from the BS for uplink channel transmission, the UE may drop the transmission of the panel violating the MPE condition and transmit the uplink channel using only the remaining panels. Alternatively, like a maximum power limitation according to the existing UE power class, the UE may perform simultaneous transmission by scaling down the power of the panel that violates the MPE condition. The power control operation may be a power back-off via a particular "P-MPR" procedure.

Hereinafter, an example of a UE/BS operation based on at least one of the aforementioned proposals 1 to 3 is as follows.

Step 0) The UE may perform reporting on panel-related capability (number of Tx/Rx panels/whether multi-panels can be simultaneously transmitted/panel switching delay/MPE threshold of proposal 1/two or more candidates of proposal 2 may be defined/configured)

Step 0-1) Reporting on proposal 1/2/3 and MPUE-assumption

Step 1) The UE may receive a configuration for a UL beam configuration indication from the BS.

Step 1-1) BS configuration based on proposal 1/2/3

Step 2) a) The UE receives SRS trigger through DL/UL grant from BS (through PDCCH) or b) when RRC/MAC CE configuration based SRS transmission time arrives or c) when PUCCH/PUSCH transmission time through DL/UL grant arrives Step 2-1) When a beam/panel that exceeds the MPE threshold of the proposals (proposals 1/2/3) is configured/indicated by the BS Step 2-1-1) Transmission of a specific UL channel/signal (e.g. PUCCH/PUSCH/SRS/PRACH, etc.) based on proposals 1/2/3

All of the above steps are not essential, and some steps may be omitted depending on the situation of the UE.

Hereinafter, effects according to proposals 1 to 3 will be described in detail.

The effects of proposal 1 are as follows. When the UE performs arbitrary SRS beam sweeping in UL beam management, SRS is transmitted, excluding a beam harmful to the human body. Therefore, a beam(s) that is not harmful to the human body may be set as a PUCCH/PUSCH beam candidate. The effect of the above operation (restriction on SRS for BM use) may be more conspicuous in the case of a UE in which beam correspondence is not established.

The effects of proposal 2 are as follows. Two or more beams are configured/indicated in configuring and indicating a UL beam to be used for uplink transmission. Accordingly, the UE has more flexibility in determining a UL beam and the MPE issue may be solved. In addition, even if there is a configuration/indication reflecting the preference of the BS in determining a UL beam, the preference of the UE may be considered according to circumstances.

The effects of proposal 3 are as follows. An operation is defined for each type of multi-panel UE in consideration of a panel as well as a UL beam to be used for uplink transmission. Accordingly, the MPE issue may be more effectively solved based on the type of the multi-panel UE.

In terms of implementation, operations (e.g., operations related to transmission of an uplink signal based on at least one of proposals 1 to 3) of the BS/UE according to the embodiments described above may be performed by the device of FIGS. 13 to 17 (e.g., the processor 102 or 202 of FIG. 14) to be described.

In addition, operations (e.g., operations related to transmission of an uplink signal based on at least one of proposals 1 to 3) of the BS/UE according to the embodiment described above may be stored in a memory (e.g., 104 and 204 of FIG. 14) in the form of an instruction/program (e.g., instruction, executable code) for driving at least one processor (e.g., 102 or 202 of FIG. 14).

A method of transmitting an uplink signal of a UE to which the embodiments described above are applied will be described in detail with reference to FIG. 11.

FIG. 11 is a flowchart illustrating a method of a UE to transmit an uplink signal in a wireless communication system according to an embodiment of the present disclosure.

Referring to FIG. 11, the method of a UE to transmit an uplink signal in a wireless communication system according to an embodiment of the present disclosure includes a step of receiving configuration information related to transmission of an uplink signal (S1110) and a step of transmitting an uplink signal (S1120).

In S1110, the UE receives configuration information related to transmission of an uplink signal from the BS.

According to an embodiment, the configuration information may include information indicating a specific beam related to a maximum permissible exposure (MPE) of a radio frequency (RF). The configuration information may be based on at least one of the proposals 1 to 3.

According to an embodiment, the specific beam may satisfy a preset condition. The preset condition may be related to at least one of transmit power or a beam direction. The preset condition may be based on the MPE condition according to proposal 1.

The transmit power of the specific beam may be less than or equal to a preset threshold. The preset threshold may be an MPE threshold according to the proposal 1.

A direction of the specific beam may be based on a predetermined direction. The predetermined direction may be based on a direction other than a human body direction.

According to an embodiment, the configuration information may include information indicating a plurality of candidate beams related to transmission of the uplink signal. The information indicating the plurality of candidate beams may be based on a field for a UL beam indication according to proposal 2. The specific beam may be one of the plurality of candidate beams. The specific beam may be a beam having the highest priority among candidate beams that satisfy the preset condition.

The method may further include a step of transmitting a UE capability information before step S1110. In the step of transmitting UE capability information, the UE transmits the UE capability information related to the plurality of panels to the BS. The UE capability information may include information on at least one of the number of panels, whether simultaneous transmission through multiple panels is possible, or a panel switching delay.

According to an embodiment, the specific beam may be based on at least one specific panel among the plurality of panels. The specific panel satisfies a specific condition, and the specific condition may be related to at least one of transmit power of the panel or a direction of the panel. The specific condition may be based on the MPE condition.

According to an embodiment, based on that the UE capability information includes information indicating simultaneous transmission through a multi-panel, the specific panel may include at least one of a panel having transmit power adjusted to satisfy the specific condition or a panel that does not satisfy the specific condition, among the plurality of panels. Transmission of the uplink signal based on a panel that does not satisfy the specific condition may be dropped. In this case, the UE may be a multi-panel UE based on MPUE-assumption 2.

According to an embodiment, the specific panel may be based on a panel having the highest priority among the panels satisfying the specific condition among the plurality of panels.

According to step S1110 described above, the operation of the UE (100/200 in FIGS. 13 to 17) receiving configuration information related to transmission of an uplink signal from the BS (100/200 in FIGS. 13 to 17) may be implemented by the device of FIGS. 13 to 17. For example, referring to FIG. 14, one or more processors 102 may control one or more transceivers 106 and/or one or more memories 104 to receive configuration information related to transmission of an uplink signal from the BS 200.

In S1120, the UE transmits an uplink signal to the BS based on the configuration information.

According to an embodiment, the transmission of the uplink signal may be based on the specific beam.

According to an embodiment, the uplink signal may be based on a sounding reference signal (SRS). The usage of the SRS may be beam management. Based on that spatial relation information related to transmission of the SRS is not configured, the SRS may be transmitted based on the specific beam.

According to an embodiment, based on that a panel switching delay for switching an activated panel to the specific panel is greater than a predetermined value, the transmission of the uplink signal may be dropped. This embodiment may be based on proposal 3 above.

According to the above-described S1120, an operation of the UE (100/200 in FIGS. 13 to 17) transmitting an uplink signal to the BS (100/200 in FIGS. 13 to 17) based on the configuration information may be implemented by the device of FIGS. 13 to 17. For example, referring to FIG. 14, the one or more processors 102 may control one or more transceivers 106 and/or one or more memories 104 to transmit an uplink signal to the BS 200 based on the configuration information.

A method of receiving an uplink signal by a BS to which the embodiments described above are applied will be described in detail with reference to FIG. 12.

FIG. 12 is a flowchart illustrating a method of a BS to receive an uplink signal in a wireless communication system according to another embodiment of the present disclosure.

Referring to FIG. 12, the method of a BS to receive an uplink signal in a wireless communication system according to another embodiment of the present disclosure includes a configuration information transmission step (S1210) related to transmission of an uplink signal and an uplink signal reception step S1120.

In S1210, the BS transmits configuration information related to transmission of an uplink signal to the UE.

According to an embodiment, the configuration information may include information indicating a specific beam related to a maximum permissible exposure (MPE) of a radio frequency (RF). The configuration information may be based on at least one of the proposals 1 to 3.

According to an embodiment, the specific beam may satisfy a preset condition. The preset condition may be related to at least one of transmit power or a beam direction. The preset condition may be based on the MPE condition according to the proposal 1.

The transmit power of the specific beam may be less than or equal to a preset threshold. The preset threshold may be an MPE threshold according to the proposal 1.

The direction of the specific beam may be based on a predetermined direction. The predetermined direction may be based on a direction other than a human body direction.

According to an embodiment, the configuration information may include information indicating a plurality of candidate beams related to transmission of the uplink signal. The information indicating the plurality of candidate beams may be based on a field for a UL beam indication according to the proposal 2. The specific beam may be one of the plurality of candidate beams. The specific beam may be a beam having the highest priority among candidate beams that satisfy the preset condition.

The method may further include a UE capability information receiving step before step S1210. In the UE capability information transmitting step, the BS receives UE capability information related to a plurality of panels from the UE. The UE capability information may include information on at least one of the number of panels, whether simultaneous transmission through multiple panels is possible, or a panel switching delay.

According to an embodiment, the specific beam may be based on at least one specific panel among the plurality of panels. The specific panel may satisfy a specific condition, and the specific condition may be related to at least one of transmit power of the panel or a direction of a panel. The specific condition may be based on the MPE condition.

According to an embodiment, based on that the UE capability information includes information indicating simultaneous transmission through a multi-panel, the specific panel may include at least one of a panel adjusted in transmit power to satisfy the specific condition among the plurality of panels or a panel not specifying the above specific condition. Transmission of the uplink signal based on a panel that does not satisfy the specific condition may be dropped. In this case, the UE may be a multi-panel UE based on MPUE-assumption 2.

According to an embodiment, the specific panel may be based on a panel having the highest priority among panels satisfying the specific condition among the plurality of panels.

According to the above-described S1210, the operation of the BS (100/200 in FIGS. 13 to 17) transmitting configuration information related to transmission of an uplink signal to the UE (100/200 in FIGS. 13 to 17) may be implemented by the device of FIGS. 13 to 17. For example, referring to FIG. 14, one or more processors 202 may control one or more transceivers 206 and/or one or more memories 204 to transmit configuration information related to transmission of an uplink signal to the UE 100.

In S1220, the BS receives an uplink signal based on the configuration information from the UE.

According to an embodiment, the transmission of the uplink signal may be based on a specific beam.

According to an embodiment, the uplink signal may be based on a sounding reference signal (SRS). The usage of the SRS may be beam management. Based on that spatial relation information related to transmission of the SRS is not configured, the SRS may be transmitted based on the specific beam.

According to an embodiment, based on that a panel switching delay for switching an activated panel to the specific panel is greater than a predetermined value, the transmission of the uplink signal may be dropped. This embodiment may be based on proposal 3 above.

According to the above-described S1220, the operation of the BS (100/200 in FIGS. 13 to 17) receiving an uplink signal based on the configuration information from the UE (100/200 in FIGS. 13 to 17) may be implemented by the device of FIGS. 13 to 17. For example, referring to FIG. 14, one or more processors 202 may control one or more transceivers 206 and/or one or more memories 204 to receive an uplink signal based on the configuration information from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 15 illustrates a signal process circuit for a transmission signal.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 16 illustrates another example of a wireless device applied to the present disclosure.

The wireless device may be implemented in various forms according to a use-case/service (refer to FIG. 13). Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 17 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of a method of transmitting and receiving an uplink signal in a wireless communication system according to an embodiment of the present disclosure and a device thereof will be described as follows.

According to an embodiment of the present disclosure, an uplink signal is transmitted based on a specific beam related to a maximum permissible exposure (MPE) of a radio frequency (RF). Accordingly, the transmission of the uplink signal may be performed to satisfy the MPE limitation. The above embodiment may solve the problems associated with the existing method. Specifically, according to the embodiment of the present disclosure, since the transmit power of the uplink signal is not directly limited, uplink coverage is not reduced. In addition, since the above embodiment does not impose a limit on an uplink subframe rate, there is no degradation in signal throughput.

According to an embodiment of the present disclosure, the specific beam is one of a plurality of candidate beams and has the highest priority among candidate beams satisfying the condition according to the MPE limitation. Since the flexibility of beam selection may be increased, the preference of the UE may be considered when the uplink signal is transmitted to satisfy the MPE limitation. In addition, the reliability of uplink signal transmission may be secured according to the situation between the UE/BS.

According to an embodiment of the present disclosure, the specific beam may be based on at least one specific panel among a plurality of panels. In the case of a UE capable of performing simultaneous transmission through a multi-panel, the transmit power of a panel that does not satisfy the condition according to the MPE limitation may be adjusted and transmitted. In the case of a UE capable of activating only one panel at a time, if the panel switching delay is greater than a predetermined value, the transmission of the corresponding uplink signal may be dropped. Therefore, transmission of the uplink signal may be performed so that the condition according to the MPE limitation is satisfied even at the panel level. In addition, transmission of an uplink signal may be performed so that the MPE limitation is effectively satisfied according to the type of the multi-panel UE.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method performed by a user equipment (UE) in a wireless communication system, the method comprising:
   receiving configuration information related to transmission of an uplink signal; and
   transmitting the uplink signal based on the configuration information,
   wherein the configuration information includes information representing a plurality of candidate beams satisfying a condition related to maximum permissible exposure (MPE), and
   wherein the uplink signal is transmitted based on a specific beam having a highest priority among the plurality of candidate beams.

2. The method of claim 1,
   wherein the condition is related to at least one of transmission power or a direction of a beam.

3. The method of claim 2, wherein the transmission power of the specific beam is smaller than or equal to a preset threshold value.

4. The method of claim 2, wherein a direction of the specific beam is based on a predetermined direction.

5. The method of claim 1, wherein the uplink signal is based on a sounding reference signal (SRS) and a usage of the SRS is beam management.

6. The method of claim 5, wherein, based on that spatial relation information related to transmission of the SRS is not configured, the SRS is transmitted based on the specific beam.

7. The method of claim 1, further comprising:
   transmitting UE capability information related to a plurality of panels,
   wherein the UE capability information includes information on at least one of (i) the number of panels, (ii) whether simultaneous transmission through multiple panels is available, or (iii) a panel switching delay.

8. The method of claim 7, wherein the specific beam is based on at least one specific panel among the plurality of panels.

9. The method of claim 8, wherein the specific panel satisfies a specific condition, and
   wherein the specific condition is related to at least one of transmission power of the panel or a direction of the panel.

10. The method of claim 9, wherein, based on that the UE capability information includes information representing simultaneous transmission through multiple panels:
    1) The specific panel includes at least one of (i) a panel whose transmission power is adjusted to satisfy the specific condition among the plurality of panels or (ii) a panel not satisfying the specific condition, and
    2) Transmission of the uplink signal based on the panel not satisfying the specific condition is dropped.

11. The method of claim 9, wherein the specific panel is based on a panel having a highest priority among panels satisfying the specific condition among the plurality of panels.

12. The method of claim 9, wherein, based on that the panel switching delay for switching an activated panel to the specific panel is greater than a certain value, transmission of the uplink signal is dropped.

13. A user equipment configured to operate in a wireless communication system, the user equipment comprising:
    one or more transceivers;
    one or more processors; and
    one or more memories configured to operably connected to the one or more processors and store instructions for performing operations when transmission of the uplink signal is executed by the one or more processors,
    wherein the operations include:
    receiving configuration information related to transmission of the uplink signal; and
    transmitting the uplink signal based on the configuration information,
    wherein the configuration information includes information representing a plurality of candidate beams satisfying a condition related to maximum permissible exposure (MPE), and
    wherein the uplink signal is transmitted based on a specific beam having a highest priority among the plurality of candidate beams.

14. A base station configured to operate in a wireless communication system, the base station comprising:
    one or more transceivers;
    one or more processors; and
    one or more memories configured to operably connected to the one or more processors and store instructions for performing operations when transmission of the uplink signal is executed by the one or more processors,
    wherein the operations include:
    transmitting configuration information related to transmission of the uplink signal; and
    receiving the uplink signal based on the configuration information,
    wherein the configuration information includes information representing a plurality of candidate beams satisfying a condition related to maximum permissible exposure (MPE), and
    wherein the uplink signal is transmitted based on a specific beam having a highest priority among the plurality of candidate beams.

* * * * *